Sept. 30, 1958   C. L. ALDERUCCIO ET AL   2,853,875
INDENTER BOND TEST
Filed Nov. 1, 1955
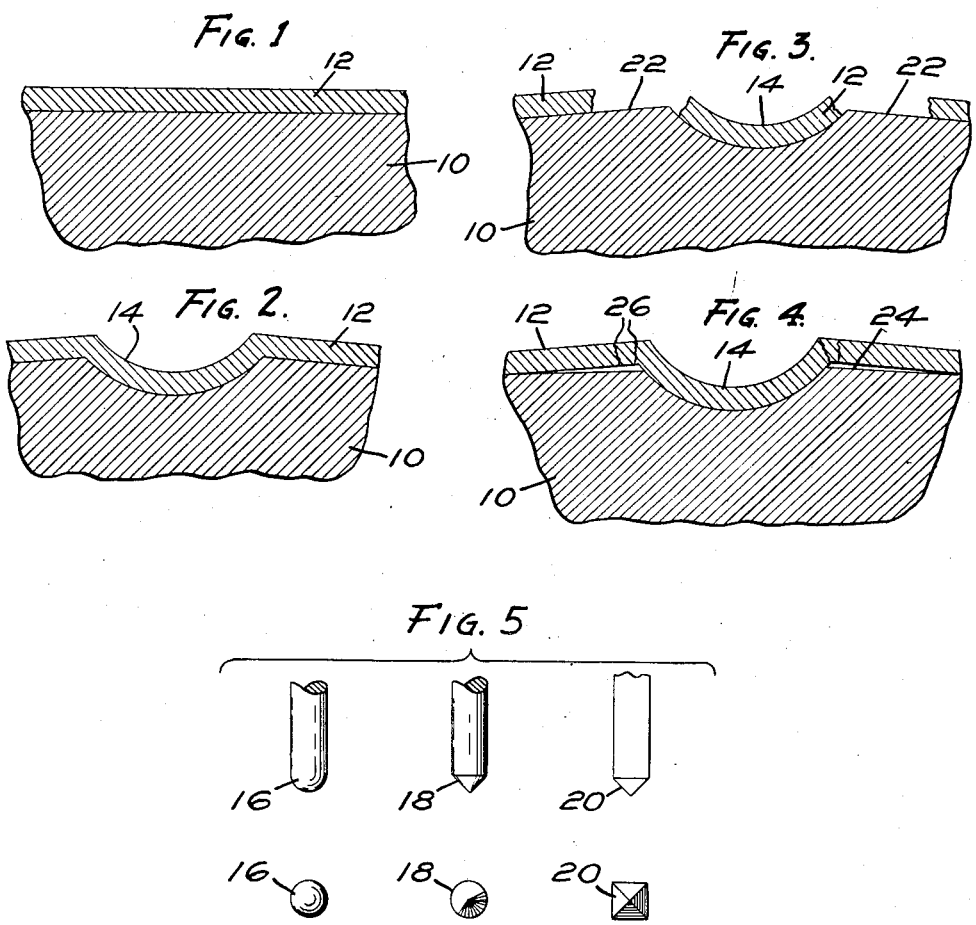
INVENTORS:
C. LEE ALDERUCCIO, HYMAN CHESSIN,
WILLIAM G. HEINRICH, JOHN G. POOR
and LEIGH L. SMITH
Beau, Brooks, Buckley & Beau,
ATTORNEYS.

United States Patent Office 2,853,875
Patented Sept. 30, 1958

2,853,875
INDENTER BOND TEST

Carmelo Lee Alderuccio, Allegany, Hyman Chessin, Olean, William G. Heinrich, Allegany, John G. Poor, Portville, and Leigh L. Smith, Olean, N. Y., assignors to Van der Horst Corporation of America, Olean, N. Y.

Application November 1, 1955, Serial No. 544,144

2 Claims. (Cl. 73—150)

This invention relates to a method for evaluating adhesion of metallic coatings or platings, such as for example chromium electrodeposits or the like. More particularly, the invention relates to a method as aforesaid which is in the nature of a relatively non-destructive test such as may be readily employed upon production items, while causing only negligible damage to the tested pieces such as may be tolerated in the final product.

Whereas several tests for measuring adhesion characteristics of chromium electrodeposits on laboratory specimens have been previously devised with satisfactory results, these prior methods are not suited for application to production items because of the very destructive nature of such tests. Such prior tests employ for example, processes of grinding; or bending; or temperature changing, as by quenching; but obviously such methods spoil the tested piece and would render a production item so tested unsuitable for its intended use.

A primary object of the present invention is to provide a simple and inexpensive bond-test procedure to be applied to chromium plated products such as will cause no damage to the product, or damage so negligible that it may be tolerated either with or without subsequent repair treatment. It is another object of the invention to provide an improved bond-check method as aforesaid which requires no elaborate apparatus and which provides on-the-spot test answers, whereby the method is suited to routine production control procedures. Other objects and advantages of the invention will appear from the specification.

In the drawing:

Fig. 1 is an enlarged fragmentary sectional view through a chromium plated metal specimen prior to application thereon of the test method of the invention;

Fig. 2 is a view corresponding to Fig. 1 but illustrating, in the case of a well bonded chromium electrodeposit on the foundation metal, a typical condition of the specimen subsequent to application of the test method thereon;

Figs. 3 and 4 are corresponding fragmentary sectional views of test specimens illustrating typical evidences of poor bonding conditions, as revealed by the test method of the invention; and Fig. 5 illustrates three exemplary end shapes for the indenter tool used in the method of the present invention.

Generally stated, the invention contemplates a novel bond testing method comprising first pressing an indentation into the plated surface to a predetermined depth. Thus, the foundation metal and the plate metal are differentially deformed and shear stresses are established at the interface between the metals. Subsequent examination, either visual, or by picking or tapping etc., will reveal whether the plate metal has remained firmly bonded to the foundation. Typical bond failures are shown in Figs. 3 and 4 wherein evidences of peeling and spalling and humping of the plate metal from the foundation metal are illustrated.

For example, as illustrated in Fig. 1, a piece to be bond-tested is illustrated to comprise a foundation metal structure 10 having an electrodeposit of chromium thereon as indicated at 12. Fig. 2 illustrates the same piece subsequent to subjecting it to an indentation treatment such as may be readily performed on the specimen by means of any suitable tool. Whereas in Fig. 2 the depression or indent 14 formed by the test method of the present invention is illustrated to have been made by means of a hemi-spherically shaped indenter as indicated for example at 16 in Fig. 5; it will of course be appreciated that any other suitably shaped indenter point may be employed such as a conically shaped point as illustrated at 18 or a pyramidal shaped point as indicated at 20 (Fig. 5). It will be evident that the point should be made of a material that will not undergo plastic deformation under the loads imposed. For example, in the case of testing the adhesion of electrodeposited chromium to cast iron foundation metal a point made of tungsten-carbide is suitable.

It has been determined that whereas an indenter point as explained hereinabove may be pressed into a well bonded chromium plated specimen without causing evidences of separation of the chromium layer from the foundation metal, in the case of a poor bond the same test will produce results such as are typified by the illustrations of Figs. 3 and 4. The pressing of the indenter point into the specimen is conducted to a predetermined depth such as will differentially displace the plate and foundation metals, thus usually causing upward swelling of the metals in the region on the perimeter of the indent so formed as shown in the drawing. In any case this action imposes differential elongation stresses in the two metals, and the accompanying shear stresses at the interface between the foundation and plated metals tend to disrupt the bond therebetween.

Thus, when a specimen having good adhesion characteristics is subjected to the test and indented as illustrated in Fig. 2 it will show no evidences of plate separation from the foundation metal, whereas specimens having poor bond characteristics will show bond failure evidences such as peeling away of the chromium plate from the edge of the indentation as illustrated in Fig. 3, or, appreciable swelling or "humping" of the chromium plate around the periphery of the indentation as illustrated in Fig. 4. In this latter case, the chromium plate will actually have separated from the foundation metal as indicated at 24 in the drawing; such separation being sometimes accompanied by fracturing as indicated at 26. In any case, examination of the indentation and the surrounding area either by the naked eye or by an optical magnifying device will readily reveal to trained personnel that the chromium plate has separated from the foundation metal.

To adapt the method of the present invention to any given type or series of production items, the indenter tool will first be pressed various distances into specimens previously classified into categories of good and poor bond; to determine the depth to which test indentations should be pressed in such specimens in order to differentiate between good and bad bonding examples. Thereafter, items from the production line may be selected at any desired intervals and tested by the method of the invention by indenting their plated surfaces with the indenter tool to the prescribed depth. Items which are so tested and which subsequently reveal no evidences of poor bonding are not appreciably harmed by the test method; but in event the tested portion requires repair this may be effected by simply "rubbing down" the tested area to level off the slight swelling and indent caused by the indenter. On the other hand, if subsequent to operation of the indenting tool examination of dented area indicates separation of the plate from the foundation metal the item will be rejected from the production line.

Any suitable tool may of course be employed for forcing the indenter point into the test specimen to the prescribed depth. For example, machines as disclosed in U. S. Patent No. 1,381,288 or machines of the so-called "Rockwell" tester type may be modified to press an indenter point into a metal surface to any prescribed depth. Or, a readily portable hand tool may preferably be employed for production line testing purposes. Such tool may assume the shape of a simple arbor or C-clamp carrying at one end an anvil to back up the work piece while carrying at the other end a hydraulic ram in a calibrated mounting. The tool many be hand powered or operated by a fluid-pressure or electrical system through a mechanical lever mechanism or a rotating screw, or the like; but in any case the tool will be provided with suitable means for controlling the penetration of the indenter point to the prescribed depth in the specimen piece as explained hereinabove.

Thus it will be appreciated that the method of the present invention distinctly differs from previously conventional testing methods for various purposes, such as for example wherein an indenter tool is applied to a specimen piece under a predetermined force, thereby indicating the hardness of the specimen through measurement of the resulting indent, or the like. As stated hereinabove, the method of the invention is applicable to production items without undue damage to properly bonded platings, whereby specimens meeting the test satisfactorily are not unduly damaged and need not be rejected from the production line. The method of the invention may be used for testing the adhesion of chromium electrodeposits on cast iron, or other ferrous materials such as steel; or on aluminum or aluminum alloys; or the like. Also, it is contemplated that the method of the invention may be applied to the testing of bonds of plating metals, other than chromium electrodeposits as discussed hereinabove.

What is claimed is:

1. The method of classifying production plated items into satisfactorily and unsatisfactorily plated categories from the standpoint of the adhesion of the plated metal layers upon the foundation metals in pluralities of like production items, which comprises establishing a reference standard by pressing an indentation tool into the plated layer of a predetermined unsatisfactorily bonded plated item to provide an indent at the surface thereof to such depth, and not appreciably deeper, as to cause the plating to visually separate from the foundation metal, and then subsequently indenting the similarly plated surfaces of the production plated items to the same depth, for grading such surfaces.

2. The method of classifying production plated items into satisfactorily and unsatisfactorily plated categories from the standpoint of the adhesion of the plated metal layers upon the foundation metals in pluralities of like production items, which comprises establishing a reference standard by pressing a round nosed indentation tool into the plated layer of a predetermined unsatisfactorily bonded plated item to provide an indent at the surface thereof to such depth, and not appreciably deeper, as to cause the plating to visually separate from the foundation metal, and then subsequently indenting the similarly plated surfaces of the production plated items to the same depth for grading such surfaces.

References Cited in the file of this patent

UNITED STATES PATENTS

| | | |
|---|---|---|
| 1,457,214 | Davis ' | May 29, 1923 |
| 1,875,134 | Pfund | Aug. 30, 1932 |
| 2,028,190 | Burns | Jan. 21, 1936 |
| 2,482,381 | Stevens | Sept. 20, 1949 |